United States Patent
Götz et al.

(10) Patent No.: US 10,391,870 B2
(45) Date of Patent: Aug. 27, 2019

(54) MODULAR POWER ELECTRONICS SYSTEM FOR CHARGING AN ELECTRICALLY OPERATED VEHICLE

(71) Applicant: Dr. Ing. h.c. F. Porsche Aktiengesellschaft, Stuttgart (DE)

(72) Inventors: Stefan Götz, Forstern (DE); Volker Reber, Michelbach an der Bilz (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 15 days.

(21) Appl. No.: 15/833,010

(22) Filed: Dec. 6, 2017

(65) Prior Publication Data

US 2018/0162229 A1 Jun. 14, 2018

(30) Foreign Application Priority Data

Dec. 9, 2016 (DE) .................. 10 2016 123 924

(51) Int. Cl.
*H02J 7/00* (2006.01)
*B60L 11/18* (2006.01)
(Continued)

(52) U.S. Cl.
CPC ............ *B60L 11/1812* (2013.01); *B60L 3/00* (2013.01); *B60L 3/0092* (2013.01); *B60L 53/11* (2019.02); *B60L 53/22* (2019.02); *B60L 53/30* (2019.02); *B60L 53/60* (2019.02); *H02J 7/0027* (2013.01); *H02J 7/0055* (2013.01); *H02J 7/022* (2013.01); *B60L 2210/10* (2013.01);
(Continued)

(58) Field of Classification Search
CPC ...... B60L 11/1812; B60L 53/60; B60L 53/22; B60L 53/11; B60L 53/30; B60L 3/00; B60L 3/0092; B60L 11/1824; H02J 7/0027; H02J 7/0055; H02J 7/022
USPC ............................................ 320/109; 701/22
See application file for complete search history.

(56) References Cited

U.S. PATENT DOCUMENTS

| | | |
|---|---|---|
| 6,628,106 B1 | 9/2003 | Batarseh et al. |
| 6,995,548 B2 | 2/2006 | Walters et al. |

(Continued)

FOREIGN PATENT DOCUMENTS

| | | |
|---|---|---|
| CN | 105141019 A | 12/2015 |
| DE | 102010052934 A1 | 5/2012 |

(Continued)

OTHER PUBLICATIONS

German Application No. 10 2016 123 924.0, dated Sep. 12, 2017, with partial English translation—9 Pages.

(Continued)

*Primary Examiner* — Zixuan Zhou
(74) *Attorney, Agent, or Firm* — RatnerPrestia

(57) ABSTRACT

A power electronics system for charging at least one electrically operated vehicle, wherein the power electronics system has at least two modules each having at least one terminal pair with DC output, at least one rectifier, at least one AC input, at least one DC link and a number of switching elements the switching elements are arranged at and/or between the DC outputs of the at least two modules in such a way that, between the at least two modules, at least one series and one parallel circuit configuration can be selectively dynamically set by suitable switching states of the switching elements.

25 Claims, 9 Drawing Sheets

(51) Int. Cl.
  *B60L 3/00* (2019.01)
  *H02J 7/02* (2016.01)
  *B60L 53/22* (2019.01)
  *B60L 53/30* (2019.01)
  *B60L 53/60* (2019.01)
  *B60L 53/10* (2019.01)

(52) U.S. Cl.
  CPC ... *B60L 2210/30* (2013.01); *H02J 2007/0059* (2013.01); *Y02T 10/7005* (2013.01); *Y02T 10/7088* (2013.01); *Y02T 10/7216* (2013.01); *Y02T 10/7241* (2013.01); *Y02T 90/121* (2013.01); *Y02T 90/127* (2013.01); *Y02T 90/128* (2013.01); *Y02T 90/14* (2013.01)

(56) References Cited

U.S. PATENT DOCUMENTS

| | | | |
|---|---|---|---|
| 7,135,836 | B2 | 11/2006 | Kutkut et al. |
| 7,596,107 | B1 | 9/2009 | Phadke et al. |
| 9,496,799 | B2 | 11/2016 | Goetz et al. |
| 2004/0130292 | A1* | 7/2004 | Buchanan ........... B60L 11/1811 320/116 |
| 2004/0189251 | A1* | 9/2004 | Kutkut .................... H02J 7/022 320/128 |
| 2011/0291616 | A1 | 12/2011 | Kim et al. |
| 2012/0326668 | A1 | 12/2012 | Ballatine et al. |
| 2013/0020989 | A1 | 1/2013 | Xis et al. |
| 2013/0307486 | A1 | 11/2013 | Chang |
| 2015/0155791 | A1 | 6/2015 | Bao et al. |

FOREIGN PATENT DOCUMENTS

| | | |
|---|---|---|
| DE | 102011079430 A1 | 1/2013 |
| DE | 102011108920 A1 | 1/2013 |
| DE | 102012212291 A1 | 2/2014 |
| EP | 2815913 A1 | 12/2014 |
| WO | 2013117425 A1 | 8/2013 |

OTHER PUBLICATIONS

Goetz et al., "Modular Multilevel Converter with Series and Parallel Module Connectivity: Topology and Control", IEEE Transactions on Power Electronics, vol. 30, No. 1, Jan. 2015, pp. 203-215.

Lesnicar et al, "An Innovative Modular Multilevel Converter Topology Suitable for a Wide Power Range", In: Power Tech Conference Proceedings, 2003, pp. 1-6.

IEC International Standard, Electric vehicle conductive charging system—Part 1: General Requirements, Edition 3.0, Feb. 2017, 292 pages.

European Search Report for European Application No. 17 020 393,9, dated Mar. 14. 2018, including partial English translation, 10 pages.

Anandarup, Das et al "A pulse width modulation technique for reducing switching frequency for modular multilevel converter," Power Electronics (IICPE), 2010 India Intl. Conference ON, IEEE, Jan. 28, 2011. pp. 1-6, XP031929665, DOI: 10.1109/IICPE.2011. 5728082, ISBN: 978-1-4244-7883-5.

Hamada, S., et al. "A new nonresonant mode zero-voltage switching DC-DC converter using phase-shifted PWM," 19900101, Jan. 1, 1990, pp. 27-33, XP006516755.

* cited by examiner

MODULAR POWER ELECTRONICS SYSTEM FOR CHARGING AN ELECTRICALLY OPERATED VEHICLE

CROSS-REFERENCE TO RELATED APPLICATIONS

This application claims priority to German Patent Application No. DE 10 2016 123 924.0, filed Dec. 9, 2016, the content of such application being incorporated by reference herein in its entirety.

FIELD OF THE INVENTION

The present invention relates to a modular power electronics system for charging at least one electrically operated vehicle at a charging post and to a corresponding method.

BACKGROUND OF THE INVENTION

Modern electric vehicles generally allow two charging modes. A vehicle has an on-board charging device for charging at a conventional AC voltage or three-phase socket, said charging device both performing the required conversion to direct current and controlling the respective charging operation. However, this AC charging mode is extremely restricted in terms of charging speed on account of the connection power available, which is generally not more than 16 A or 32 A, and on account of the installation of the charging device with sufficient power. This results in modern electric vehicles having charging times of several hours for every 100 km.

On account of the high charging times for AC charging, DC charging with DC voltage has been developed. In contrast to AC charging, in this case the corresponding vehicle does not have its own charging device. Instead, the charging post outside the vehicle carries out the charging process and likewise forms voltage and current as is necessary for charging a respective vehicle battery. DC charging lines provided accordingly are connected directly to corresponding poles of the high-voltage battery in the vehicle during the charging process. The powers of DC charging stations are currently up to 50 kW. However, charging powers in the region of more than 300 kW would be desirable in order to surpass charging speeds of more than 20 km/min. Furthermore, a charging voltage of up to 1000 V should be sought, in order to achieve a corresponding charging speed. Recharging during travel could thus be brought to orders of magnitude that customers are used to when filling up vehicles with internal combustion engines.

Exemplary details regarding DC charging and the corresponding processes in the charging system and in the vehicle are described in the current version of DIN EN 61851 as of the filing date of the German priority application, for example, which is incorporated fully herein by reference.

To enable higher charging speeds, various motor vehicle manufacturers are planning to enhance their vehicles from the previously usual 400 V charging technology to at least 800 V charging technology, which can correspond approximately to a working range of 600 V to 950 V, sometimes even 420 V to 980 V, on account of the voltage that is dependent on the state of charge and a certain variance in one configuration of the vehicle battery. A higher power can be transferred given the same current on account of the high voltage. It is therefore possible, by way of the charging duration, to solve one of the main problems of electrically operated vehicles.

However, not all manufacturers and vehicles will convert or be converted to 800 V charging technology. Nevertheless, a charging post and hence the electronics system used therein should be capable of being able to charge all vehicles that are to be charged, as far as possible.

The charging process is not constantly operated at a fixed voltage, even in 800 V vehicles. A vehicle is connected and the vehicle sets the voltage of the post initially approximately to its own battery voltage in a similar manner to a laboratory voltage source. The vehicle then connects the set voltage to the battery, sets a current limit on the charging post and sets the voltage limit, generally to a value between its own battery voltage and the charging connection voltage. The vehicle delivers the settings to the charging post by means of digital communication. There are therefore two limits, wherein the lower limit at the particular time dominates the regulation. In the current-regulation range, which dominates right at the start and in the middle of the charging process, the voltage assumes values significantly above the maximum. As a consequence, the power electronics system of the charging post has to cover a very high voltage range.

However, since the power electronics system cannot raise the current to the same extent at the same time on account of limits of the components comprised by the power electronics system, in particular the semiconductors and the inductances, the charging power undesirably drops in this range. Conventional vehicles with a low voltage therefore cannot be charged with the peak power of the power electronics system. Empty batteries must likewise first increase in voltage until the peak power is achieved on account of the maximally constant current, even though the batteries allow the highest charge currents and powers specifically at average states of charge.

In practice, it is very important, on account of safety for the vehicles and for the users, that the high-voltage connections of each charging point have to be isolated from all other charging points as well as from ground and the respective grid connection. Until now, only individual charging posts or correspondingly individual charging points that have fully distinct grid connections and act independently of one another have therefore been used in practice. Although there are also designs according to which a plurality of charging posts are combined, these designs entail only very minor simplifications in the construction and hence only limited cost savings compared to a solution having fully independent charging posts. One of these designs provides for the charging posts to have a common DC link, which consequently also has the same electrical potential for all charging points, and dedicated DC/DC converters for each charging point, said DC/DC converters having to be DC-isolated in turn for the abovementioned isolation.

It is further known to provide DC isolation not in the power electronics system itself but in a transformer having a plurality of taps that is to be connected to the power electronics system.

However, this approach does not solve the problem mentioned at the outset of a decreasing power at charge voltages under the peak voltage either.

U.S. Pat. No. 7,609,037, which is incorporated by reference herein, and an article by A. Lesnicar, R. Marquardt, "An innovative modular multilevel converter topology suitable for a wide power range" Power Tech Conference Proceedings, 2003 IEEE Bologna, vol. 3, p. 6 disclose circuits for a modular multilevel converter MMC, which allows switching over between series interconnection and bypass interconnection of individual modules and is incorporated by reference herein. DE 10 2010 052 934 and DE 10 2011 108 920, which are incorporated by reference herein, and S. M. Goetz, A. V. Peterchev, T. Weyh (2015) "Modular multilevel converter with series and parallel module connectivity: topology and control", IEEE Transactions on Power Electronics, vol. 30, pp. 203-215, which is incorporated by reference herein, describe modular multilevel converters having series and parallel connectivity (MMSPC), which further allow switching over from parallel to series interconnection of modules.

However, none of these described circuits is suitable for DC voltage conversion in order to be able to charge all vehicles that are to be charged, as far as possible. Multiphase DC/DC converters are known. U.S. Pat. No. 6,628,106, for example, thus describes a multiphase DC/DC converter with combined current and voltage regulation. U.S. Pat. No. 6,995,548, which is incorporated by reference herein, describes a combination of a plurality of phases with different electrical parameters, for example rated current, in order to optimize the quality of the current at the output. U.S. Pat. No. 7,596,007, which is incorporated by reference herein, describes a multiphase DC/DC converter and associated inverter having DC isolation in the form of what is known as an LLC component. All of these circuits comprise hardwired DC/DC converters, which generate the respective output voltage, in particular in parallel. None of the described circuits is suitable for the abovementioned problem from the field of charging technology. None of the mentioned circuits is capable of drawing power from an AC grid, preferably a medium-voltage grid, and/or of switching over between voltage and current by reconfiguring modules or circuit components.

DE 10 2012 212 291 A1, which is incorporated by reference herein, describes an apparatus for rapid electrical DC charging, wherein a DC/DC regulator module has a DC/DC step-down module without DC isolation and has a DC/DC resonance converter module for DC isolation.

WO 2013/117425 A1, which is incorporated by reference herein, discloses a modular converter for a charging station, said modular converter comprising at least two charging modules connected in parallel with one another.

Against the background of the prior art, it was accordingly an object of the present invention to provide a possibility of being able to carry out a charging process in an electrically operated vehicle with the maximum possible power, even in a low voltage range, of ensuring, in the process, DC isolation between the vehicle and the external grid at the same time.

SUMMARY OF THE INVENTION

The present invention achieves said object by a power electronics system having the features of independent claim 1. Further configurations can be gathered from the dependent claims and the description.

A power electronics system for charging at least one electrically operated vehicle is accordingly provided, wherein the power electronics system has at least two modules each having at least one terminal pair with DC output, at least one rectifier, at least one AC input, at least one DC link and a number of switching elements, wherein the switching elements are arranged at and/or between the DC outputs of the at least two modules in such a way that, between the at least two modules, at least one series and one parallel circuit configuration can be selectively set by suitable switching states of the switching elements.

In one configuration, each of the at least two modules has a rectifier.

The respective rectifier of the respective modules is, in one configuration, a passive rectifier, downstream of which, in a further configuration, a step-down converter having at least one output capacitor is connected as DC/DC converter, as a result of which the incoming alternating current is brought to a desired output voltage in the range of 400 V to 950 V, for example, in order to charge a connected HV battery of a vehicle. The passive rectifier can be realized with six rectifier diodes, for example. The respective AC input of the respective modules is connected to a charging socket or a charging station for single-phase to three-phase alternating current. In this case, a transformer is generally interposed between the charging socket or the charging station and the respective AC inputs of the at least two modules.

As an alternative thereto, the respective rectifier of the respective modules is an active rectifier. However, the use of passive rectifiers is substantially more advantageous. In the prior art, when using passive rectifiers, the problem arises that the passive rectifiers generally create very high distortions and interference in the grid on account of the lack of control, said distortions and interference not being tolerated by grid operators, and therefore entail a demand for expensive filters and/or even adversely influence the operation of the system itself on account of disturbances. However, the modularity provided in accordance with the invention now allows the voltage quality (for example expressed by the THD) and the disturbance with respect to the respective grid to be significantly improved on account of the flexibly implementable interconnection of the modules with one another.

The proposed power electronics system makes it possible to switch over the electrical interconnection of the at least two modules, wherein the modules in this case are DC modules, in order, at an approximately constant power, to provide either the peak voltage at rated current or a reduced voltage at an increased current depending on requirements. The dynamic range switch-over of voltage and current is achieved by the modularity provided in accordance with the invention, in order to increase the voltage steps at the cost of the current, for example. In one configuration of the power electronics system according to aspects of the invention, a stepped range switch-over of this kind can be used during a charging process. For example, at the beginning of the charging process, a low voltage but a high current is generally required, whereas at the end of the charging process, the required voltage increases as current decreases.

The power electronics system according to aspects of the invention therefore corresponds to a type of electronic gearbox or a power converter, in order to allow a switch-over between current intensity and voltage in certain step sizes.

The power electronics system according to aspects of the invention is also referred to in the following text as a modular multi-phase multilevel DC/DC converter, MMMDDC or M3D2C for short. In a similar way to the MMSPC for AC voltages, the MMMDDC allows reconfiguration of the interconnection of the modules or the output capacitors thereof in series and in parallel. In this case, the reconfiguration in the case of more than two implemented modules can also be mixed series-parallel. For example, there are three possibilities in the case of three modules: all in parallel, all in series, one module in series with a parallel combination of two modules.

In one configuration of the power electronics system of the invention, the number of switching elements is selected depending on the number of modules.

In a further configuration of the power electronics system according to aspects of the invention, at least one module of the at least two modules can be controlled and/or regulated within a specific voltage and/or current range.

In accordance with a further embodiment of the power electronics system according to aspects of the invention, at least one module comprises at least one DC/DC converter connected in series with the rectifier.

In accordance with a further embodiment of the power electronics system according to aspects of the invention, the switching elements are embodied as disconnectable semiconductor switches, such as IGBTs or FETs or the like, for example. Depending on the circuit embodiment, that is to say depending on the type of switching elements used, in particular in the case of disconnectable semiconductor switches, the reconfiguration can take place without interruption during operation. As an alternative thereto, for example when the switching elements are embodied as non-disconnectable mechanical switches or thyristors, the reconfiguration can take place without power. Prior to switch-over, the power output is accordingly reduced to under a certain limit, which makes it possible to switch the switches over without causing damage.

In a still further configuration of the power electronics system according to aspects of the invention, the respective at least one rectifier is DC-isolating.

In an alternative configuration of the power electronics system according to aspects of the invention, the respective at least one DC/DC converter of the at least one module is DC-isolating.

As already described above, in a further alternative configuration, each of the modules of the power electronics system according to aspects of the invention can be connected to a DC-isolating transformer by means of the at least one AC connection.

In accordance with the invention, modules having a lower voltage than the peak voltage and a circuit, that is able to ensure that a higher voltage does not occur at any of the at least two modules are used. Components with a significantly lower dielectric strength can therefore be used safely in spite of a desired high output voltage in the case of series interconnection of the modules. The lower voltage of the components reduces the costs considerably.

In accordance with one possible configuration of the power electronics system according to aspects of the invention, the respective connection of the respective modules is connected to the transformer by means of respective undervoltage taps.

By using phase-offset windings on the at least one rectifier, that is to say the correspondingly feeding rectifier of each module, for example star/delta windings for 12-pulse rectification or else winding set-ups with phase angles therebetween, for example Z windings, it is possible to achieve an improvement in the fundamental harmonics and, by offsetting the switching clocks of the DC/DC modules, it is possible to achieve an improvement in the switching harmonics. In this way, the disturbances in the respective modules become orthogonal to one another. Since the power of each module is furthermore now only a small portion of the total power, the disturbance drops significantly.

The output quality on the part of the vehicle can be significantly increased in the same way. For this purpose, the clocking of the individual modules should be offset either asynchronously or in a targeted manner against one another.

The output quality, in particular residual current ripple and voltage ripple, can increase up to quadratically with the number of modules. The offset can emulate a significantly higher effective switching rate. The frequency of the residual ripples increases with the switching rate, as a result of which the charging decreases and either the filters can become smaller or considerably improved values can be achieved given the same filter size. Each module now carries only a small portion of the total voltage or the total current, as a result of which a respective amplitude of the current ripple or the voltage ripple drops.

In accordance with one possible configuration of the power electronics system according to aspects of the invention, it is provided that, in the event of a fault in one of the at least two modules, the faulty module can be isolated or charge current can be made to bypass the faulty module, respectively, by specifically setting the switching states of the respective switching elements.

Using a plurality of modules also increases the fail-safety of the system. If one module in the system fails, the affected charging point, at which a respective vehicle is to be charged, can nevertheless continue to be operated. The switching elements provided allow in this case for faulty modules to be isolated or for the charge current to be made to bypass said faulty modules. If an adequately large number of functional modules should no longer be available, the maximum current or the maximum voltage can be restricted, however. However, such a restriction is significantly preferable to a total breakdown, as could be expected in the prior art.

In a further configuration, the power electronics system comprises at least one redundancy module, which, in the event of a failure of one of the at least two modules, functionally replaces the faulty module by suitably changing the switching states of the respective switching elements. As a result, in the event of a failure of modules, unrestricted operation until the next service is made possible.

The present invention further relates to a corresponding method for charging at least one electrically operated vehicle using the power electronics system described above.

Further advantages and configurations of the invention emerge from the description and from the appended drawing.

It is self-evident that the features mentioned above and the features yet to be discussed below may be used not only in the respectively specified combination but also in other combinations or individually without departing from the scope of the present invention.

BRIEF DESCRIPTION OF THE DRAWINGS

The invention is schematically illustrated in the drawings with reference to embodiments and is described schematically and in detail with reference to the drawings.

DETAILED DESCRIPTION OF THE INVENTION

Figure 1:
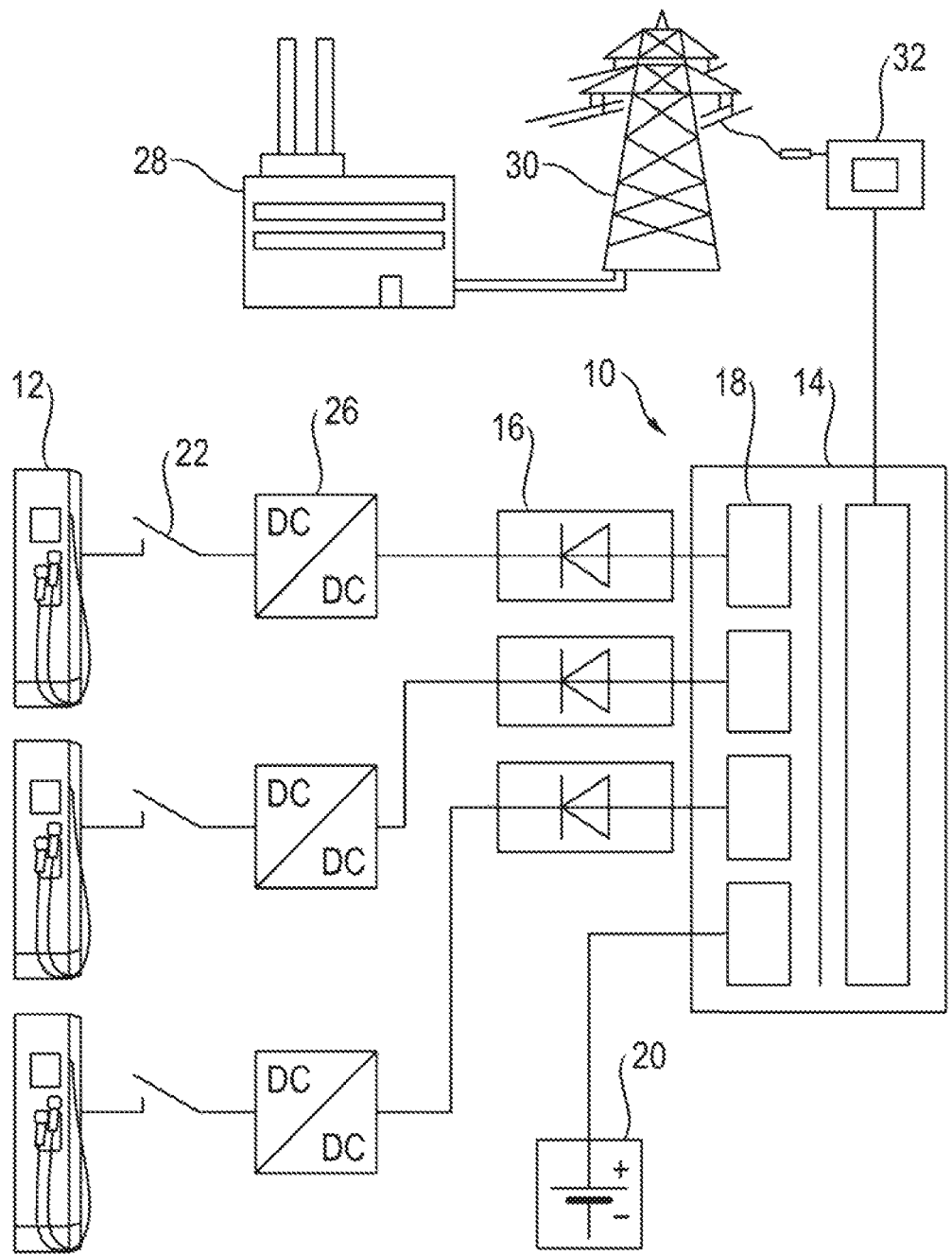
FIG. 1 shows a schematic illustration of a simplified design of a charging station having a plurality of charging points for charging a plurality of electrically operated vehicles in accordance with the prior art.

FIG. 1 shows the simplified design of a charging station 10 for charging at least one electrically operated vehicle, that is to say a plug-in vehicle at one of three charging posts 12. The charging station 10 comprises a power transformer 14 having an insulation monitor and safety measures. The power transformer 14 is fed with a medium voltage of 20 kV, for example, by an upstream transformer 32 of a medium-voltage grid. Said upstream transformer is in turn fed from a power plant 28 via an extra-high-voltage and high-voltage grid 30 operated with voltages of between 110 and 380 kV.

The charging station 10 is embodied as a central high-power AC/DC converter. The charging station 10 comprises three rectifier modules 16, which are connected to three DC-isolated terminal leads 18 of the power transformer 14 and are combined to form a multi-pole busbar, in order to provide an intermediate grid having a total power of 600 kW. A fourth terminal lead 18 is connected to a buffer store 20 with feedback capability in the charging station 10. In this case, a power factor correction filter of the rectifier modules 16 acts as the mains filter of the charging station 10.

The power transformer 14 and the rectifier modules 16 are configured in such a manner that the rectifier modules 16 emit a low DC voltage of between 950 V and 2000 V if the power transformer 14 is fed with a medium voltage of 20 kV. This as yet unregulated low DC voltage is adapted to the charge voltage of a motor vehicle to be charged, which is between 200 and 1000 V, generally 800 V, by one of three simple step-down DC/DC converters 26 in the infrastructure. A charge voltage that is stabilized in this way is delivered to the motor vehicle, under the control of a switch 22, by the charging post 12 with a charging power of 150 kW.

FIG. 2 shows a schematic illustration of a simplified design of a charging station having a charging point for charging an electrically operated vehicle. Said FIG. shows two modules that in this case are fixedly wired to one another. Each module comprises an AC/DC converter 220 and a DC/DC converter 210 connected in series therewith and having an output terminal pair. Each of the AC/DC converters 220 can be connected at its respective AC input 221 to a transformer (not shown here) and thereby to a charging socket or charging source (likewise not shown here). Depending on requirements, the respective AC input 221 of the respective modules is connected to a charging socket for single-phase to three-phase alternating current. The respective AC/DC converters 220 of the respective modules in this case have DC isolation, as symbolized by double lines the blocks illustrating the AC/DC converters. That is to say that the required DC isolation is in this case provided in the power electronics system and not in the transformer (not illustrated here).

Figure 2A:
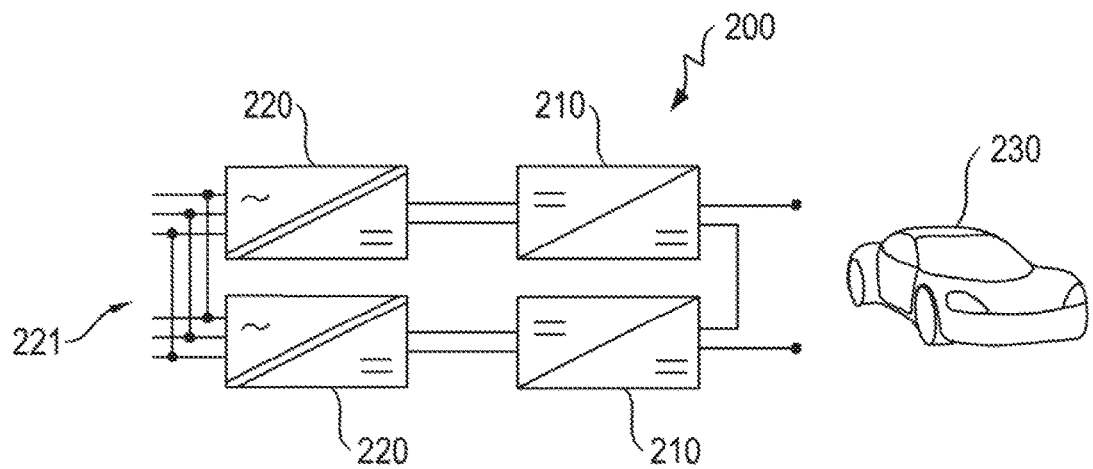
FIGS. 2a and 2b show schematic illustrations of a simplified design of a charging station having a charging point for charging an electrically operated vehicle.

In FIG. 2a, the modules are fixedly wired to one another by means of one of their terminals in each case. The remaining two terminals of the two modules together form the DC output, to which a vehicle 230 to be charged can be connected.

Figure 2B:
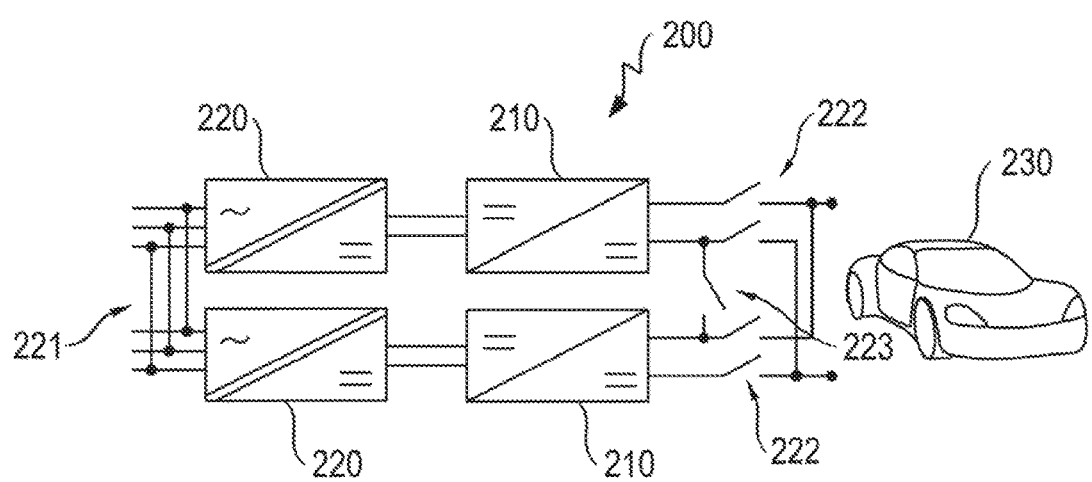

In FIG. 2b, the modules have in each case two switching elements 222 or contactors at their respective terminal pair. Furthermore, a further switching element 223 is provided at a connection between the modules. A total of five switching elements are provided in the power electronics system having two modules. If switching element 223 and the two outer switching elements 222 of the respective terminal pair of the modules are closed, the switching state of the modules that are fixedly wired to one another from FIG. 2a is present. In this case, the modules are connected in series with one another. By providing the switching elements 222 and 223, it is now also possible to design the interconnection of the modules in a flexible manner and, depending on requirements, to dynamically selectively change said interconnection, that is to say to reconfigure it. If all switching elements 222 are closed and the switching element 223 is left open, the modules are thus connected in parallel with one another.

In contrast to FIG. 1, by providing modules in the power electronics system, an output power of the power electronics system is divided, as a result of which the components of the individual modules have to meet lower power demands and accordingly can be implemented more inexpensively. As shown here in FIG. 2, there are for this purpose at least two modules each having at least one terminal pair with DC output and switching elements arranged at and/or between the DC outputs of the at least two modules in such a way that an electrical circuit configuration between the at least two modules can assume at least one series and one parallel circuit configuration by way of suitable switching states of the switching elements.

At least one of modules can advantageously be controlled and/or regulated within a specific voltage and/or current range, in order to design the DC output in a way that it can be set. All modules can also optionally have DC outputs that can be set.

In FIG. 2, the DC isolation is provided in the respective AC/DC converters 220. As a result, advantageous DC/DC converters 210 can be used. In principle, however, the DC isolation can also be realized in the DC/DC converters 210. The AC/DC converters 220 enable current-controlled and/or voltage-controlled generation of a DC voltage to feed DC links and to charge correspondingly associated HV batteries, which are not shown here.

Figure 3:
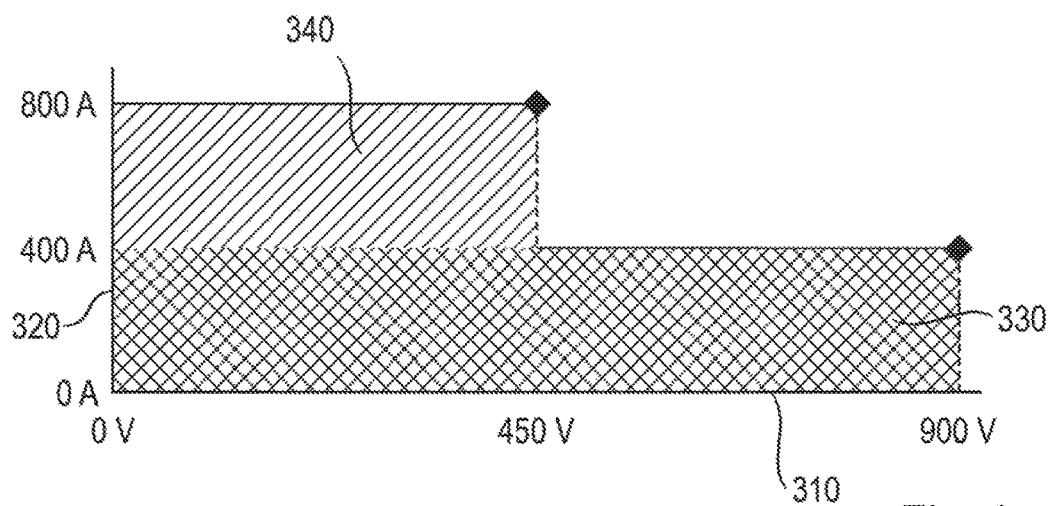
FIG. 3 shows a graph of a working range of a power electronics system.

FIG. 3 shows a graph, which illustrates respectively achievable working ranges of a power electronics system having modules interconnected in different ways to one another. In this case, the voltage in volts [V] is illustrated on an abscissa 310 and the current in amperes [A] is illustrated on an ordinate 320. Whereas in the case of a fixed series interconnection of the modules, which can also be realized by a correspondingly larger module, the working range extends over a range of between 0 V and 950 V, but possibly also of between 0 V and 1000 V or of between 0 V and 1500 V, prospectively perhaps even of between 0 V and >1500 V up to approximately 350 A, 400 A, 500 A or prospectively possibly 600 A, said working range can be correspondingly expanded in parallel operation of the two modules, that is to say it extends in a range of between, for example, 0 V and 450 V for example up to approximately 700 A, 800 A or prospectively possibly up to approximately 1000 A. As a result, the modularly and flexibly connectable power electronics system effectively realizes a kind of electrical transmission with stepped current-voltage switch-over. The numerical values cited here and specified in FIG. 3 are purely exemplary and are not intended to be restrictive.

A range of advantages is achieved by way of the inventively provided division of the power electronics system into modules of the same kind or individual modules. Previously incompatible voltage relationships are adjusted. High-voltage batteries that are available and are to be provided in a respective DC link do not have sufficient capacity to provide the power required to charge 800 V vehicles. A charge voltage of approximately 950 V is required for this. On account of the voltage that is dependent on the state of charge of the battery and certain variance in the battery configuration, this can correspond to a working range of from 600 V to 950 V, or even of from 420 V to 980 V. A working range of this kind can be realized by providing a multiplicity of modules of the same type, which can be connected together to form a respective power electronics system. Furthermore, significant costs can be saved in production and purchasing (economies of scale effects). It is possible to achieve an increased degree of efficiency for operation of the individual modules that is close to their respective maximum degree of efficiency by reconfiguration of the interconnection of the individual modules, which is made possible in accordance with the invention. When using isolating switching elements, it is possible to dispense with further DC contactors toward the vehicle to be charged through the arrangement of the switching elements.

Figure 4A:
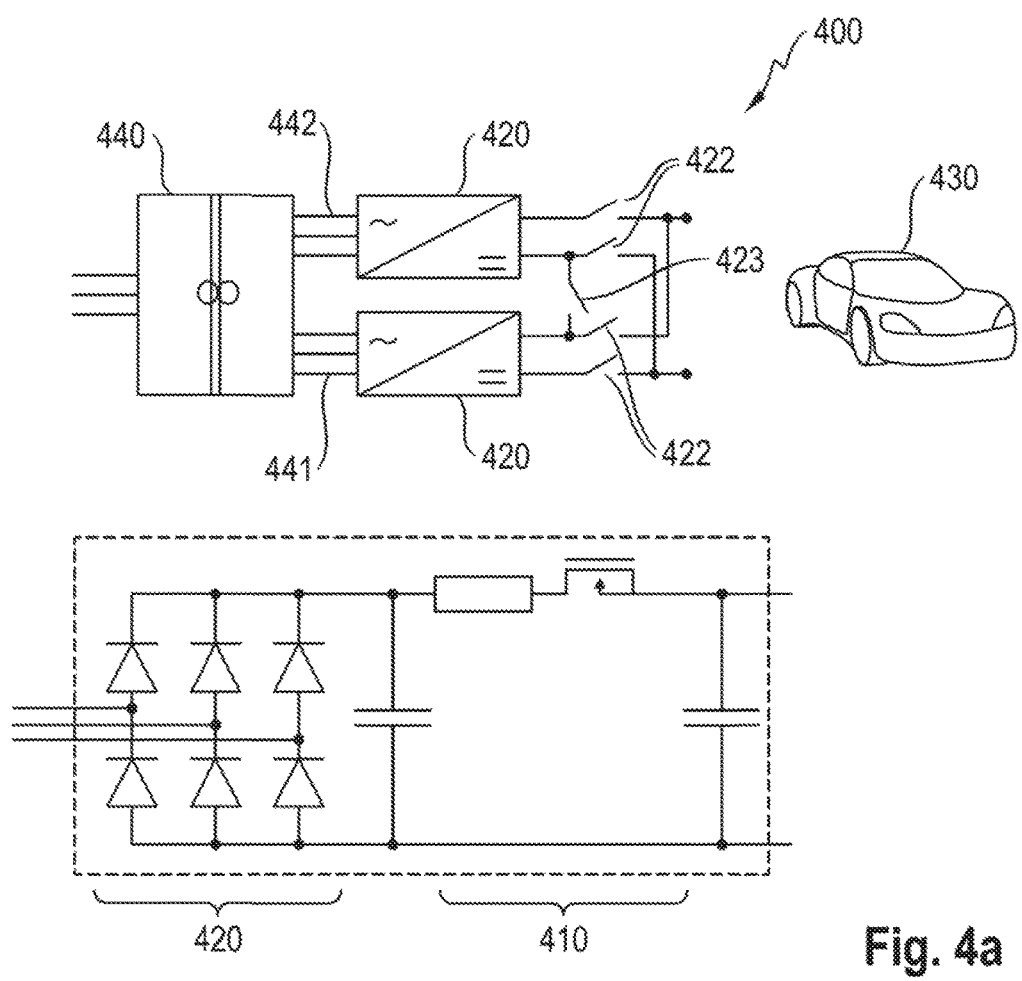
FIGS. 4a, 4b, and 4c show schematic illustrations of circuit diagrams of various embodiments of the power electronics system according to aspects of the invention.

FIG. 4a shows a schematic illustration of a circuit diagram of one embodiment 400 of the power electronics system according to aspects of the invention. The power electronics system 400 illustrated here comprises two modules, which each have at least one rectifier 420. The respective rectifier 420 in this case comprises six rectifier diodes as is illustrated in the lower area of FIG. 4a. A DC/DC converter 410 (not illustrated in the upper part of FIG. 4a) can optionally be connected downstream of a respective rectifier 420. A DC/DC converter 410 that is connected downstream in this manner can be realized by a step-down converter, as indicated in the lower area of FIG. 4a. The capacitances illustrated in the lower area of FIG. 4a are optional. The rectifier 420 can be a passive rectifier. The respective rectifier 420 can be connected to a transformer 440 by means of a Y winding set-up 442 or by means of a Δ winding set-up 441. Each of the two winding set-ups 442 and 441 is three-phase. The two modules of the power electronics system 400 are interconnected with one another by means of switching elements 422, 423 in such a way that they together form a charging point for a vehicle 430 that is to be charged. In the example shown in FIG. 4a, the transformer is configured with DC isolation. As a result, DC isolation no longer needs to be provided in the power electronics system itself, as a result of which the components to be used for the power electronics system can be configured in a more inexpensive manner. As an alternative to this, however, the AC/DC converter 420 or else the DC/DC converter 410 could also be realized with DC isolation. When using isolating switches, it is possible to dispense with further DC contactors toward the vehicle through the arrangement of the switching elements 422, 423.

Figure 4B:
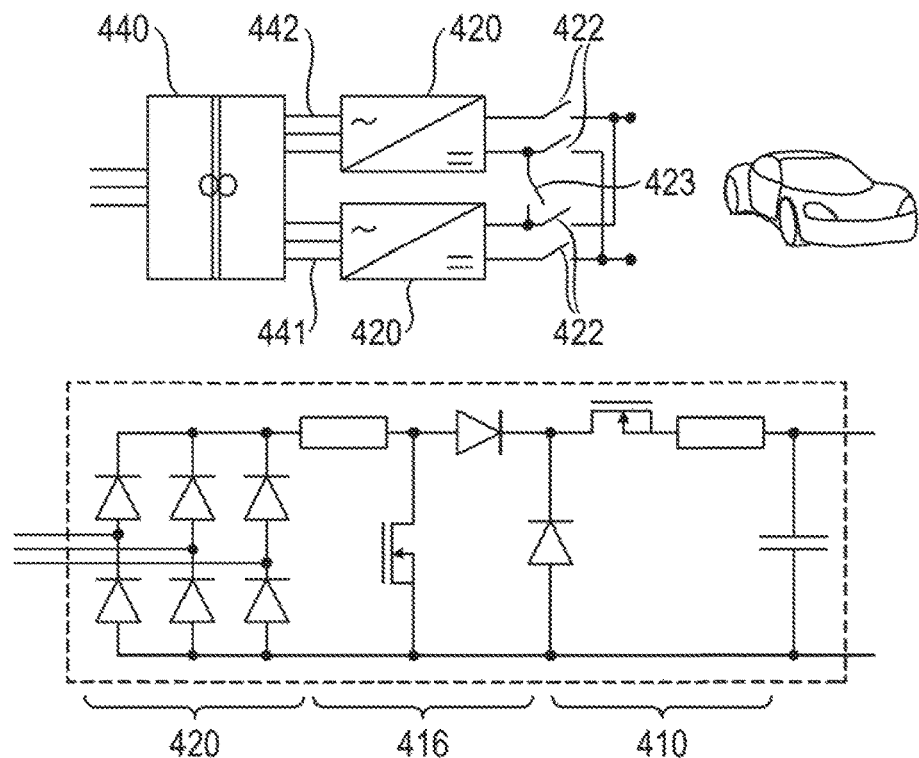

FIG. 4b shows a further schematic illustration of a circuit diagram of one embodiment of the power electronics system according to aspects of the invention. The power electronics system illustrated here again comprises two modules, which each have at least one rectifier 420. The respective rectifier 420 in this case comprises six rectifier diodes as is illustrated in the lower area of FIG. 4b. A DC/DC converter 410 (not illustrated in the upper part of FIG. 4b) can optionally be connected downstream of a respective rectifier 420. A DC/DC converter 410 that is connected downstream in this manner can be realized by a step-down converter, as indicated in the lower area of FIG. 4b. The capacitance comprised by the step-down converter 410 is optional. The rectifier 420 can be a passive rectifier. In this case, a PFC (power factor correction) stage 416 is connected between the passive rectifier 420 and the step-down converter 410. A possibly unsymmetrical and non-sinusoidal current consumption by the power electronics system can lead to negative effects on the power supply system. A high harmonic content in the non-sinusoidal current ensures more power loss in corresponding transformer substations, which needs to be additionally generated by the power plants. Furthermore, respective phase currents of the three-phase system are hardly balanced any more, which leads to higher compensation currents. One solution to non-sinusoidal current is the mentioned power factor correction (PFC) 416. The PFC stage 416 can stabilize an unequal flow of current by means of the rectifier 420. As a result, a higher current quality compared to a corresponding grid connection is made possible. The respective rectifier 420 can be connected to a transformer 440 by means of a Y winding set-up 442 or by means of a Δ winding set-up 441. Each of the two winding set-ups 442 and 441 is three-phase. The two modules of the power electronics system 400 are interconnected with one another by means of switching elements 422, 423 in such a way that they together form a charging point for a vehicle 430 that is to be charged. In the example shown in FIG. 4b, the transformer is configured with DC isolation. As a result, DC isolation no longer needs to be provided in the power electronics system itself, as a result of which the components to be used for the power electronics system can be configured in a more inexpensive manner. As an alternative to this, however, the AC/DC converter 420 or else the DC/DC converter 410 could also be realized with DC isolation. When using isolating switches, it is possible to dispense with further DC contactors toward the vehicle through the arrangement of the switching elements 422, 423.

Figure 4C:
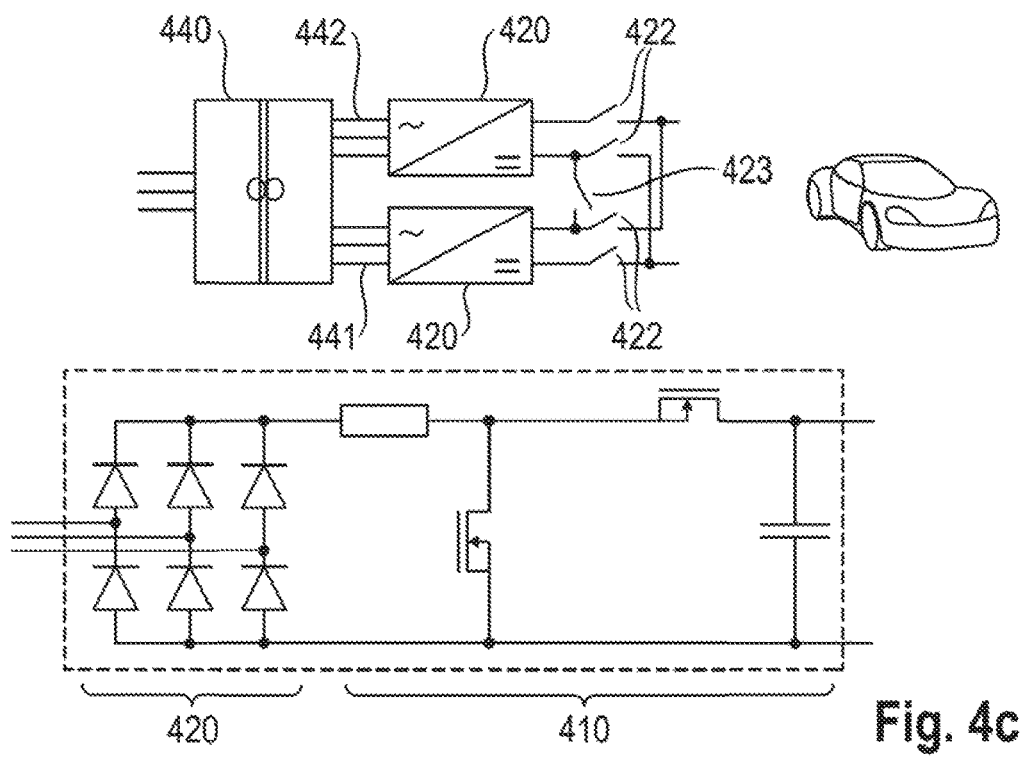

FIG. 4c show schematic illustration of a circuit diagram of a further embodiment of the power electronics system according to aspects of the invention. The power electronics system illustrated here again comprises two modules, which each have at least one rectifier 420. The respective rectifier 420 in this case comprises six rectifier diodes as is illustrated in the lower area of FIG. 4c. A DC/DC converter 410 (not illustrated in the upper part of FIG. 4c) can optionally be connected downstream of a respective rectifier 420. A DC/DC converter 410 that is connected downstream in this manner can be realized by a step-up/step-down converter for simultaneous PFC, as indicated in the lower area of FIG. 4c. The separate PFC stage is embodied here as a boost converter (step-up converter). As an alternative thereto, said PFC stage can likewise by drawn into the buck converter (step-down converter). The capacitance comprised by the DC/DC converter 410 is optional. The rectifier 420 can be a passive rectifier. The respective rectifier 420 can be connected to a transformer 440 by means of a Y winding set-up 442 or by means of a Δ winding set-up 441. Each of the two winding set-ups 442 and 441 is three-phase. The two modules of the power electronics system 400 are interconnected with one another by means of switching elements 422, 423 in such a way that they together form a charging point for a vehicle 430 that is to be charged. In the example shown in FIG. 4c, the transformer 440 is configured with DC isolation. As a result, DC isolation no longer needs to be provided in the power electronics system itself, as a result of which the components to be used for the power electronics system can be configured in a more inexpensive manner. As an alternative to this, however, the AC/DC converter 420 or else the DC/DC converter 410 could also be realized with DC isolation. When using isolating switches, it is possible to dispense with further DC contactors toward the vehicle through the arrangement of the switching elements 422, 423.

Figure 5:
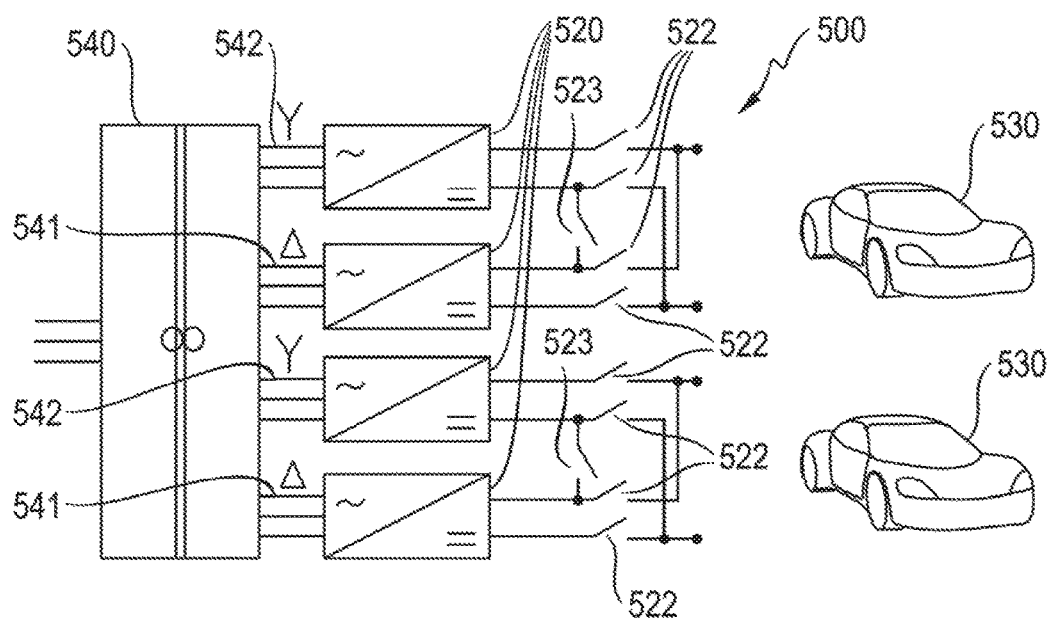
FIGS. 5, 6 and 7 show respective implementations of more than one charging point for various technologies for charging a corresponding plurality of vehicles to be charged.

FIG. 5 shows one implementation of an embodiment of the power electronics system according to aspects of the invention having more than one charging point, in this case having two charging points. Here, accordance with the split power line technology developed by Porsche, a transformer 540 is coupled to the embodiment 500 of the power electronics system according to aspects of the invention. The transformer 540 is connected to each rectifier 520 of a respective module of the power electronics system by means of a multiplicity of undervoltage taps and in each case three-phase, but different, windings 542 and 541, respectively. The windings can be Y windings 542 or Δ windings 541. In the case shown here, that is to say in accordance with the principle of split power line technology, the power electronics system 500 is not DC-isolated, but the upstream transformer 540 is. Each module of the power electronics system 500 comprises at least one rectifier 520. The rectifier 520 can be supplemented with a DC/DC converter (not illustrated here). The power electronics system 500 shown here comprises four individual modules, which are interconnected with one another by means of a total of ten switching elements 522, 523 and together form a total of two charging points for two corresponding vehicles 530 that are to be charged.

Figure 6:
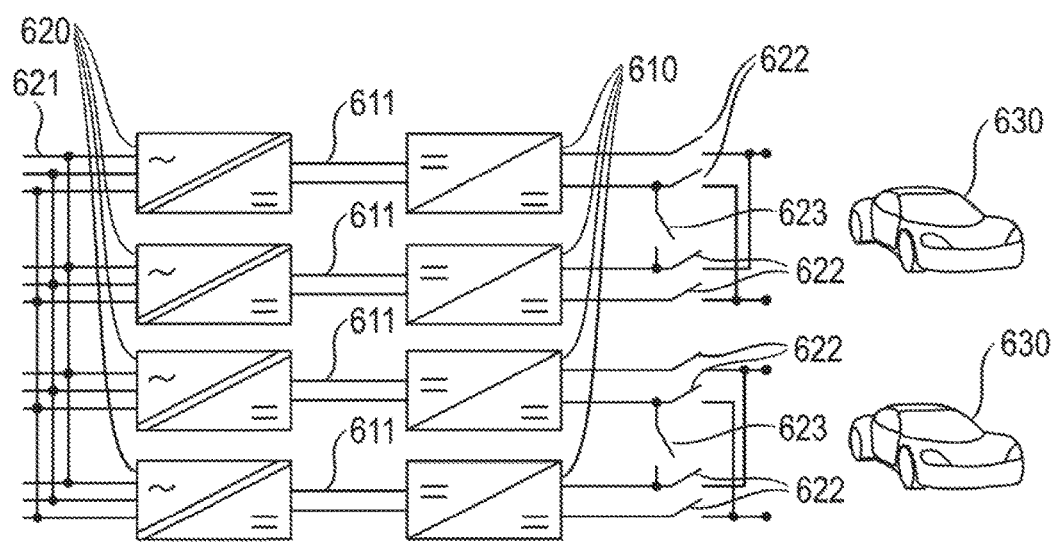

FIG. 6 shows one implementation of a further embodiment of the power electronics system according to aspects of the invention having more than one charging point, in this case having two charging points. In this case, the power electronics system comprises four modules. Each of the four modules comprises a rectifier 620, a DC link 611 and a DC/DC converter 610 connected in series therewith. The DC link couples a plurality of electrical grids as energy stores on an interposed voltage level. The four modules have a common AC connection 621 configured as a three-phase AC connection. There must be DC isolation between the common AC connection 621 and the vehicles 630 that are to be connected to the two charging points, said DC isolation being realized here in the respective rectifiers 620 of the individual modules, which is indicated by respective double lines in the respective blocks symbolizing the respective rectifiers 620. The required DC isolation could also be realized in the respective DC/DC converters 610, wherein said DC/DC converters are preferred since DC isolation is easier to realize here.

Figure 7:
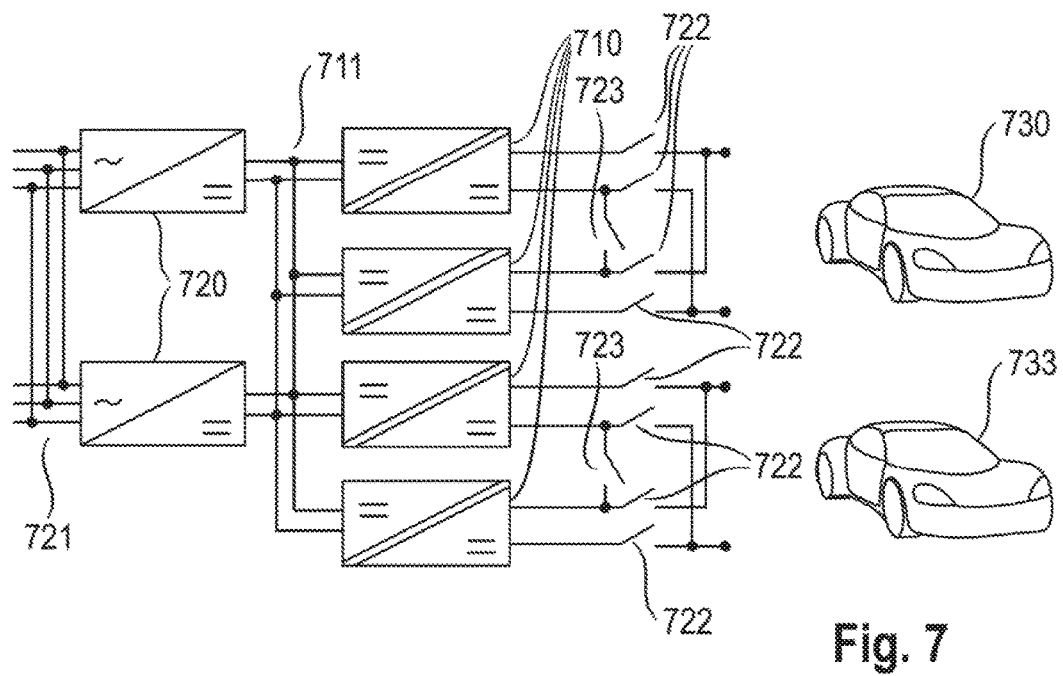

FIG. 7 shows one implementation of yet a further embodiment of the power electronics system according to aspects of the invention having more than one charging point, namely in this case having two charging points, in order to be able to charge two corresponding motor vehicles 730. Each of the four modules comprises a DC/DC converter 710. The four modules have a common DC/DC link 711. The DC/DC link 711 is fed here by two rectifiers 720. In principle, the DC/DC link 711 could be fed by one or more rectifiers 720. There must be DC isolation between the DC/DC link 711 and the vehicles 730 that are to be charged, which, in the example shown, is achieved by DC isolation in the respective DC/DC converters 710, as is indicated by a respective double line in the respective blocks representing the DC/DC converters. The four modules have a common AC connection 721 configured as a three-phase AC connection. The modules can be interconnected with one another in a flexible and dynamically reconfigurable manner at their respective DC outputs by means of switching elements 722, 723.

Figure 8:
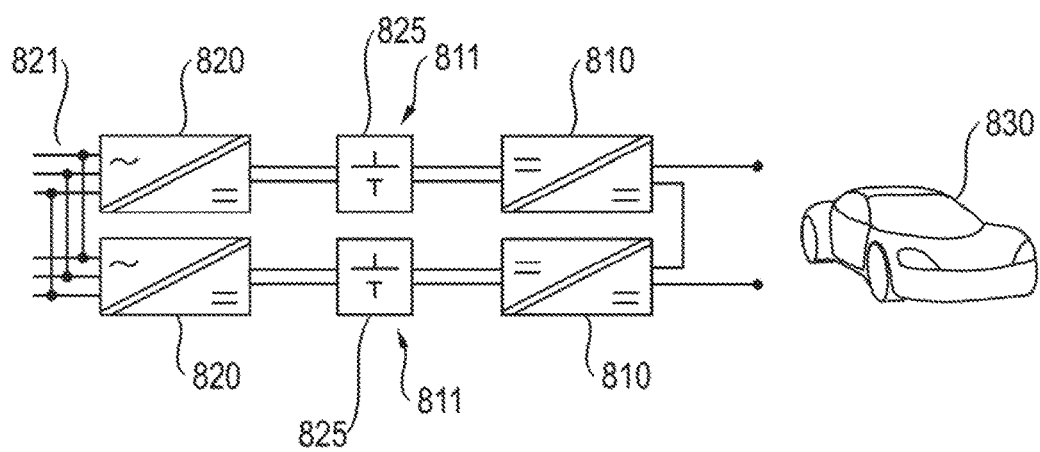
FIG. 8 shows a schematic illustration of a power electronics system.

FIG. 8 shows a schematic illustration of a power electronics system. The power electronics system illustrated here has one charging point, at which a vehicle 830 can be charged. Generally, the vehicle 830 that is to be charged has a DC charging cable, which is provided with a plug at the end and which can be connected thereby to an output terminal pair, which is formed by the modules, of the power electronics system. The charging point comprises a plurality of modules, in this case two modules of the same type, the output terminal pairs of which in turn feed the DC charging cable for the vehicle 830 in electrical series interconnection. A flexible interconnection is realized in accordance with the invention (in contrast to the fixed interconnection illustrated here) by providing a plurality of switching elements between the respective output terminal pairs of the respective modules and/or between the respective output terminal pairs of the respective modules and the charging point. In this case, each module comprises an AC/DC converter 820, which converts AC or three-phase power to a DC voltage and in the process produces DC isolation between the AC input and the DC output of the power electronics system. The DC voltage is generated in a current-controlled or voltage-controlled manner. It is preferably generated in both a current-controlled and a voltage-controlled manner. Here, in each case the lower limit value is active, for example in cascaded regulation with an inner voltage regulator and an outer current regulator. Here, each module further comprises a DC link 811, which is fed by the at least one AC/DC converter 820. Here, each module further comprises a high-voltage store 825, which is electrically connected to the DC link 811 in such a way that the high-voltage store 825 can output power to the DC link 811 and/or can retrieve power from said DC link. Each module further comprises a DC/DC converter 810, which can retrieve power from the DC link 811 and can output said power to at least one output terminal pair. The DC/DC converter 810 is preferably a buck converter, such that the voltage at the output terminal pair of the module, which voltage is generated by the DC/DC converter 810, is lower than the voltage of the DC link 811. On account of the DC isolation in the respective AC/DC converters 820, inputs can be fed from the same energy supply grid.

At least one of the charging lines can comprise contactors and/or fuses to be able to isolate the vehicle from a charging point. The contactors are preferably open, except in the charging mode, if a desired charge current not equal to zero is flowing. The contactors are further opened.

Figure 9:
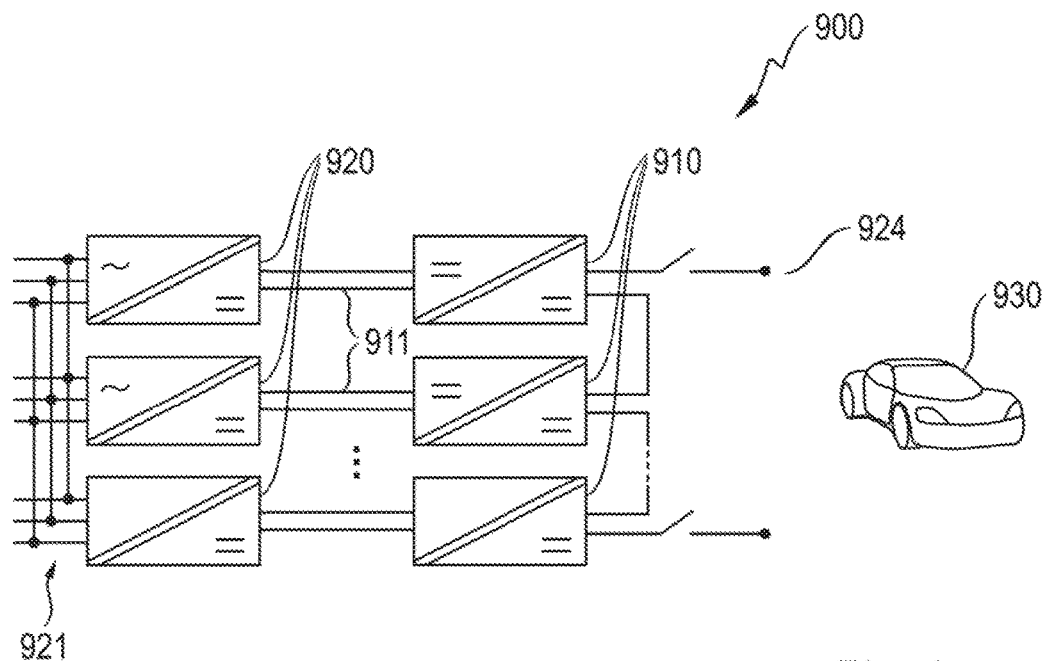
FIG. 9 shows a schematic illustration of a power electronics system having N modules.

FIG. 9 shows a schematic illustration of a power electronics system having N modules. The power electronics system 900 has one charging point, that its to say one output terminal pair 924, at which a vehicle 930 can be charged. The power electronics system comprises N modules of the same type, as indicated by three points underneath one another. Each module comprises a DC/DC converter 910 and an AC/DC converter 920 connected in series therewith.

In between there is a DC link 911 in each case. The required DC isolation between the AC input and the charging point is realized in the respective AC/DC converters 920, as symbolized by a respective double line in the respective blocks of the AC/DC converters 920. The N modules have a common single-phase or polyphase AC input 921. The N modules are fixedly interconnected with one another at their respective output terminal pairs. Safety switches are provided at the charging lines toward the charging point.

Figure 10:
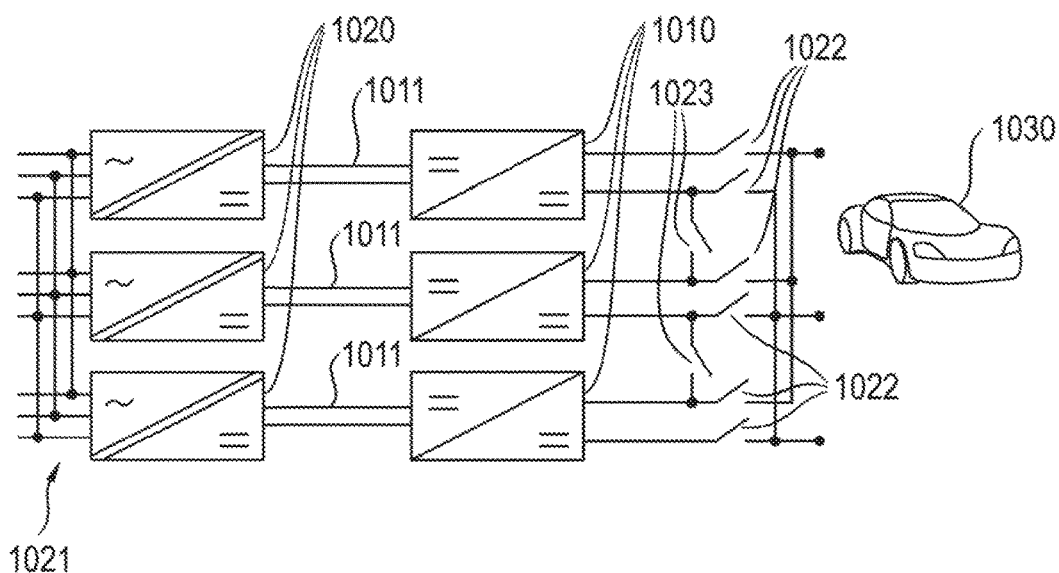
FIG. 10 shows a schematic illustration of one embodiment of the power electronics system according to aspects of the invention having three modules.

FIG. 10 shows a schematic illustration of one embodiment of the power electronics system according to aspects of the invention having three modules. Each module comprises a DC/DC converter 1010 and an AC/DC converter 1020 connected in series therewith. A respective DC link 1011 is provided in between. The required DC isolation between the AC input and the charging point is realized in the respective AC/DC converters 1020, as symbolized by a respective double line in the respective blocks of the AC/DC converters 1020. The three modules have a common single-phase or polyphase AC input 1021. A flexible interconnection of the modules, that is to say in series, in parallel or mixed series-parallel can be realized by switching elements 1022, 1023 provided between respective output terminals of the respective modules and the charging point, by means of which switching elements the modules can be interconnected with one another. As a result, the working range of the power electronics system can be switched over dynamically, as a result of which vehicles with different charging technologies can be charged at the charging point provided by the power electronics system.

Figure 11A:
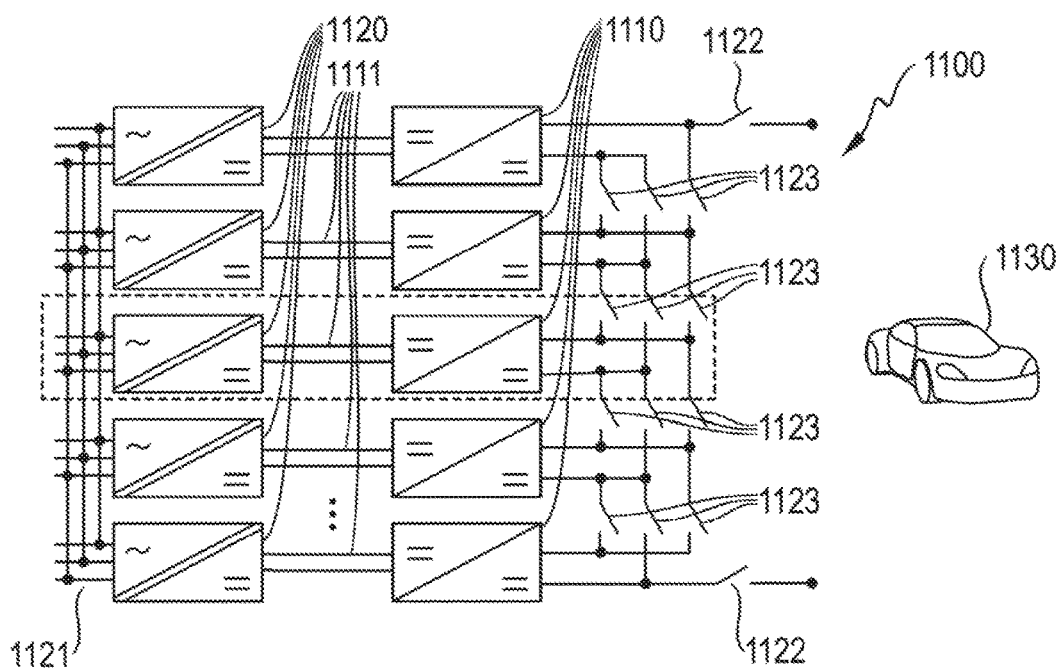
FIGS. 11a and 11b show schematic illustrations of two further embodiments of the power electronics system according to aspects of the invention.

FIG. 11*a* shows schematic illustration of a further embodiment of the power electronics system according to aspects of the invention. The power electronics system 1100 illustrated here comprises a charging point for charging a vehicle 1130 and N modules of the same type (as indicated by three points underneath one another), which each comprise an AC/DC rectifier 1120 with DC isolation, a DC link 1111 and a DC/DC converter 1110. One module is illustrated as a replicable block by dashed lines. The modules have a common single-phase or polyphase AC connection or a common single-phase or polyphase AC bus 1121. The modules can be flexibly interconnected with one another and dynamically enable a mixed series-parallel configuration by way of the further provided switching elements 1122, 1123 at the respective output terminal pairs of the individual modules. Output contactors 1122 can be provided at the common output terminal pair of the modules, that is to say ultimately at the terminal pair at which the vehicle is to be connected, that is to say the charging point. These are optional, but for safety reasons are the rule. Generally, each module could also consist of just one rectifier 1120. In the case of pure buck conversion of the voltage in each rectifier, a simple active rectifier can be used.

Figure 11B:
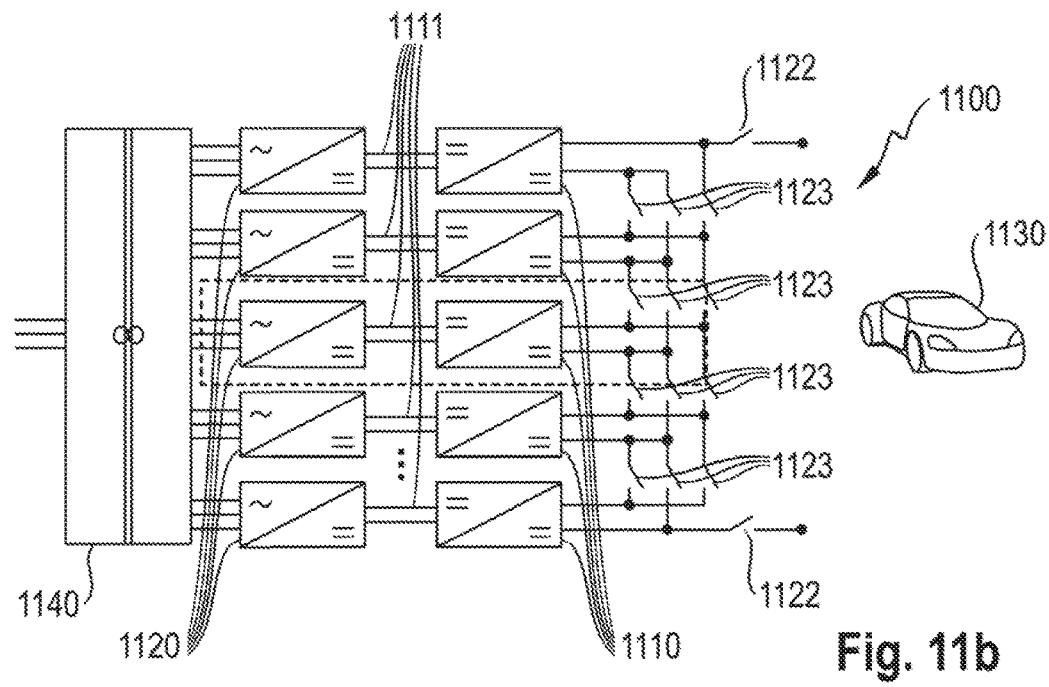

FIG. 11*b* shows a schematic illustration of a further embodiment of the power electronics system according to aspects of the invention, which essentially illustrates an alternative embodiment to the embodiment shown in FIG. 11*a*. Instead of respective DC isolation in the AC/DC converters, here the DC isolation takes place outside the power electronics system, namely in a transformer 1140, which is connected upstream of the AC/DC converters 1120. The transformer 1140 can be embodied here with a plurality of secondary-side winding set-ups. As a result of the fact that the DC isolation is provided exclusively in the transformer 1140, cost-effective and efficient non-DC-isolating circuits can be used for the power electronics system components.

As an alternative, instead of a combination of rectifiers (AC/DC converters), DC link and DC/DC converters provided here in the respective modules, it is also possible to use a rectifier with a DC output voltage that can be set. When in this case the output voltage is selected to be sufficiently low compared to the input voltage of the rectifier, said rectifier only has to step-down the voltage, as a result of which very simple active voltage-led rectifier circuits and even current-led phase gating circuits can be used. Phase gating circuits are known, for example, from dimmers, locomotives and HVDC converters and use inexpensive thyristors or triacs. If a corresponding actively controllable AC/DC converter is used, it can directly step-down the AC voltage. A polyphase bridge circuit composed of semiconductor switches, for example IGBTs, FETs, various transistors (for voltage-led circuits) or thyristors (for current-led circuits) can be used as a typical circuit.

Figure 12:
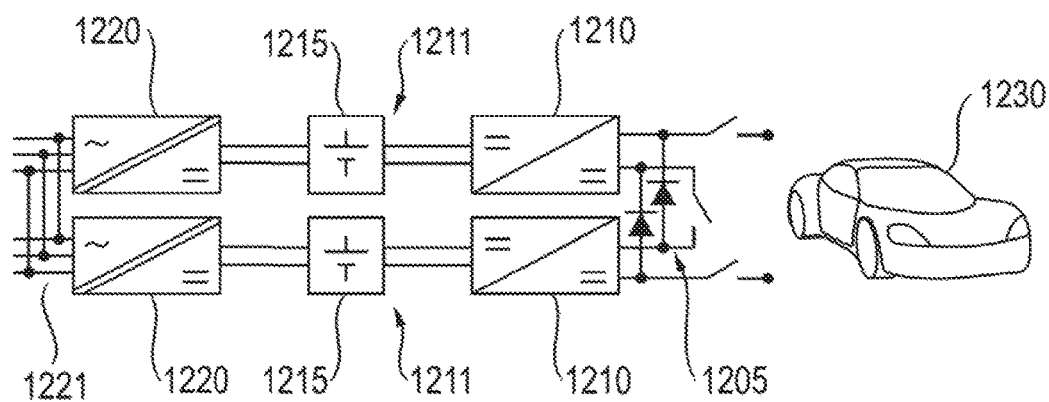
FIG. 12 shows a schematic illustration of yet a further embodiment of the power electronics system according to aspects of the invention.

FIG. 12 shows a schematic illustration of a further embodiment of the power electronics system according to aspects of the invention. The power electronics system comprises two modules, which each comprise a rectifier 1220, a DC/DC converter 1210 and a DC link 1211 with a high-voltage store 1215. The two modules have a common single-phase or polyphase AC connection 1221. The switching elements provided between the vehicle 1230 or charging point, at which the vehicle 1230 is to be charged, and the DC/DC converters 1210, said switching elements allowing flexible interconnection of the modules with one another, are in this case at least partially configured as semiconductor switches 1205, that is to say in this case specifically two of five switching elements are configured as semiconductor switches. In the example shown here, two of the switching elements are realized by passive diodes 1205. In this case, it is advantageous for the semiconductor switches 1205 to have to be designed in terms of their reverse voltage only for a maximum output voltage of one of the DC/DC converters 1210.

Figure 13:
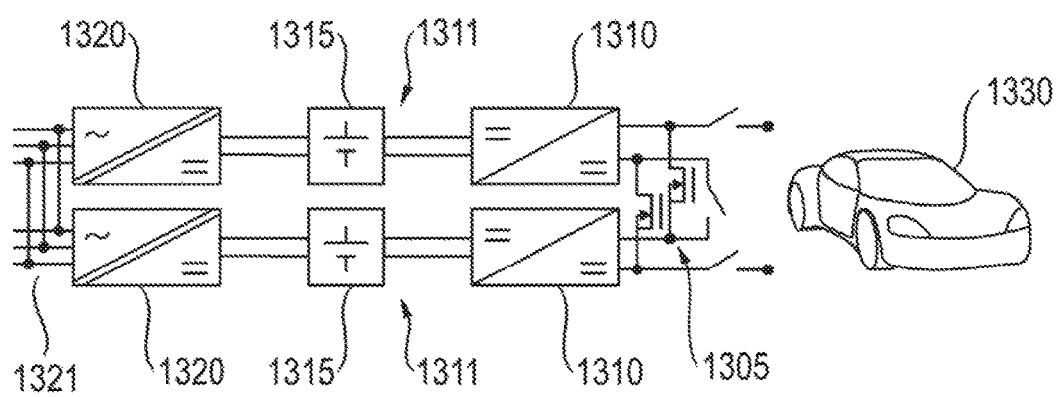
FIG. 13 shows schematic illustration of an alternative embodiment of the power electronics system according to aspects of the invention to the embodiment shown in FIG. 12.

FIG. 13 shows a schematic illustration of an alternative embodiment of the power electronics system according to aspects of the invention to the embodiment shown in FIG. 12. The power electronics system comprises two modules, which each comprise a rectifier 1320, a DC/DC converter 1310 and a DC link 1311 connected in between with a high-voltage store 1315. The two modules have a common single-phase or polyphase AC connection 1321. Compared to FIG. 12, in this case at least one of the diodes, in this case both diodes, is replaced in each case by an active semiconductor 1305. In this case, for example, these may be thyristors or IGBTs at high voltages or field-effect transistors (FETs) at low voltages. In particular, unipolar, majority-carrier-based semiconductor switches, for example FETs, offer the advantage of considerably lower power losses as compared with passive diodes.

What is claimed is:

1. A power electronics system for charging at least one electrically operated vehicle, the power electronics system comprising:

at least two modules, each module having at least one terminal pair with DC output, at least one rectifier, at least one AC input, at least one DC link, and switching elements having switching states, the switching elements arranged between the DC outputs of the at least two modules such that, between the at least two modules, at least one series and one parallel circuit configuration is selectively dynamically set by the switching states of the switching elements, wherein:

the switching elements include an inner switching element connected between a respective terminal pair of the at least two modules;

for each module, the switching elements include a respective pair of outer switching elements connected to the respective terminal pair of each module, when the inner switching element and the respective pair of outer switching elements are closed, the at least two modules are connected in the series circuit configuration, and when all of the outer switching elements are closed and the inner switching element is open, the at least two modules are connected in the parallel circuit configuration.

2. The power electronics system as claimed in claim 1, which further comprises at least one high-voltage device.

3. The power electronics system as claimed in claim 1, wherein the switching elements are arranged at least one of at or between the respective terminal pairs of the at least two modules.

4. The power electronics system as claimed in claim 1, wherein the respective DC outputs of the at least two modules are connected selectively to the switching elements so as to form at least one charging point for charging the at least one electrically operated vehicle.

5. The power electronics system as claimed in claim 1, wherein at least one module of the at least two modules is at least one of controlled or regulated within at least one of a specific voltage or current range.

6. The power electronics system as claimed in claim 1, wherein each of the at least two modules further comprises a rectifier.

7. The power electronics system as claimed in claim 6, wherein at least one of the at least two modules further comprises at least one DC/DC converter connected in series with the respective rectifier of the at least one module.

8. The power electronics system as claimed in claim 1, wherein each of the at least two modules comprises a DC/DC converter, and wherein the DC/DC converters of the at least two modules are fed by at least one common rectifier.

9. The power electronics system as claimed in claim 1, wherein the respective at least one rectifier is DC-isolating.

10. The power electronics system as claimed in claim 1, wherein the power electronics system is configured such that each of the modules is connected to a DC-isolating transformer by the at least one AC connection.

11. The power electronics system as claimed in claim 7, wherein the respective at least one DC/DC converter of the at least one module is DC-isolating.

12. The power electronics system as claimed in claim 10, wherein the power electronics system is configured to connect the DC-isolating transformer to the respective AC connection of the respective modules by respective under-voltage taps.

13. The power electronics system as claimed in claim 1, wherein the at least two modules includes more than two modules, wherein each of the modules is interconnected with one another in a reconfigurable manner in series, in parallel, or in mixed series-parallel.

14. The power electronics system as claimed in claim 1, wherein the power electronics system is configured, at an approximately constant output power, to provide either a peak voltage at rated current or a reduced voltage at a correspondingly increased current depending on requirements by corresponding switching of the switching elements.

15. The power electronics system as claimed in claim 1, wherein at least a portion of the switching elements is configured to enable reconfiguration of the power electronics system without interruption by changing the interconnection of the switching elements with one another during operation.

16. The power electronics system as claimed in claim 15, wherein the at least a portion of the switching elements comprises disconnectable switching elements.

17. The power electronics system as claimed in claim 16, wherein the disconnectable switching elements are disconnectable semiconductor switches.

18. The power electronics system as claimed in claim 17, wherein the disconnectable semiconductor switches are insulated-gate bipolar transistors of field effect transistors.

19. The power electronics system as claimed in claim 1, wherein reconfiguration of the power electronics system is realized without power by changing the interconnection of the switching elements with one another.

20. The power electronics system as claimed in claim 6, wherein the rectifiers of the respective modules is passive and comprises windings that are offset with respect to one another to improve voltage quality by reducing total harmonic distortion (THD).

21. The power electronics system as claimed in claim 1, wherein, in the event of a fault in one of the at least two modules, the faulty module is isolated or charge current bypasses the faulty module, respectively, by setting the switching states of the respective switching elements.

22. The power electronics system as claimed in claim 1, further comprising: at least one redundancy module, which, in the event of a failure of one of the at least two modules, functionally replaces the faulty module by changing the switching states of the respective switching elements.

23. The power electronics system as claimed in claim 1, wherein respective clockings of the individual modules are offset either asynchronously or in a targeted manner against one another such that the offset emulates a higher effective switching rate.

24. A method for charging at least one electrically operated vehicle, wherein a power electronics system as claimed in claim 1 is used.

25. The method as claimed in claim 24, wherein the power electronics system is fed with a medium voltage by a transformer connected in between included with DC isolation.

* * * * *